Feb. 16, 1943.   W. J. KERNS ET AL   2,311,342
SULPHUR REMOVAL FROM HYDROCARBONS
Filed March 15, 1941   2 Sheets-Sheet 1

William J. Kerns
Clayton M. Beamer Inventors
By P. L. Young Attorney

Patented Feb. 16, 1943

2,311,342

UNITED STATES PATENT OFFICE 2,311,342

SULPHUR REMOVAL FROM HYDROCARBONS

William J. Kerns, Rahway, and Clayton M. Beamer, Roselle, N. J., assignors to Standard Oil Development Company, a corporation of Delaware Application March 15, 1941, Serial No. 383,646

11 Claims. (Cl. 260—553)

The present invention is concerned with a reaction involving carbonyl sulphide and monoethanolamine. The invention is more particularly concerned with a novel method for removing carbonyl sulphide from gaseous mixtures and from solutions containing the same, and for the production of diethanol urea. In accordance with the present process, carbonyl sulphide is removed and diethanol urea formed utilizing monoethanolamine. A preferred modification of the present process comprises employing the monoethanolamine in an aqueous solution.

It is known in the art to remove objectionable sulphur compounds from gaseous mixtures and solutions containing the same, as for example, hydrogen sulphide and mercaptans, by loosely reacting the same in a treating zone with solutions comprising various alkyl amines, such as monoethanolamine, di-ethanolamine, tri-ethanolamine, and the like. In these operations, gaseous or liquid mixtures containing the objectionable sulphur compounds are usually countercurrently contacted with a solvent comprising various ethanolamines under temperature and pressure conditions adapted to dissolve the objectionable sulphur compounds. A treated gas or liquid substantially completely free of objectionable sulphur compounds is separated and removed from the treating zone, while the ethanolamine solution containing the loosely reacted sulphur compounds is also removed and handled in a manner to free the solution of the loosely reacted sulphur compounds. This is usually accomplished by heating the same in a regeneration zone. The ethanolamine solution is removed from the bottom of the regeneration zone and recycled to the treating zone. We have, however, now discovered that providing the solution comprises essentially monoethanolamine and preferably comprises an aqueous solution of the same, it is possible to remove substantially completely carbonyl sulphide and to form a reaction product, that is, diethanol urea by a completely novel reaction. Carbonyl sulphide cannot be removed from gas mixtures or from solutions containing the same by closely related solvents, as for example, di-ethanolamine and tri-ethanolamine, or by other solvents such as sulphuric acid and ammonia to the degree and with the efficiency which is secured by the solvent of the present invention.

Figure 1:
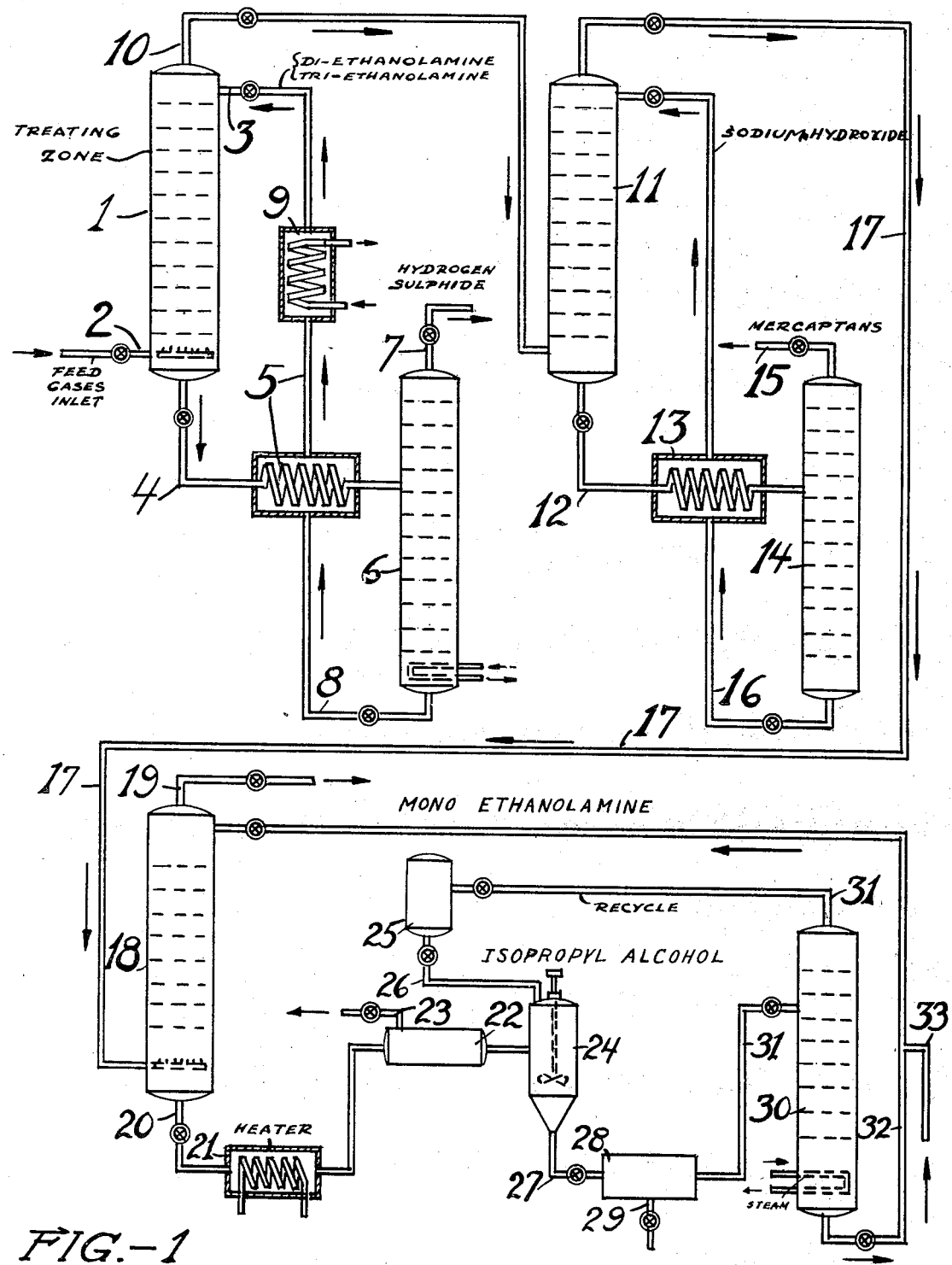
Figure 2:
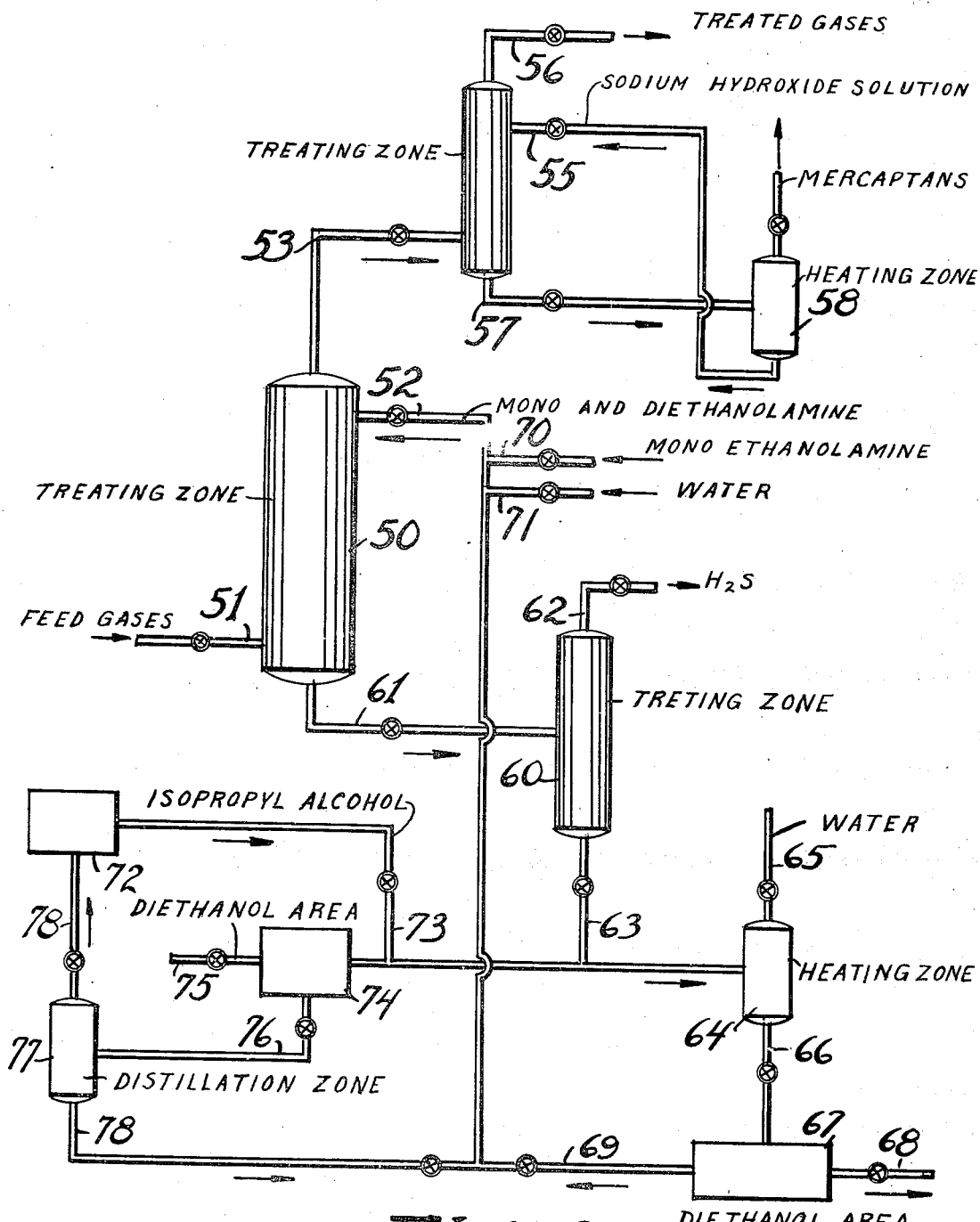

Our invention may be more readily understood by reference to the attached drawings illustrating modifications of the same. Figure 1 illustrates a preferred modification of our process, in which other objectionable compounds are removed in an initial stage or stages prior to removing the carbonyl sulphide. Figure 2 illustrates a modification of our invention, in which all sulphur compounds are removed in one stage.

Referring specifically to Figure 1, it is assumed for the purpose of illustration that the feed comprises a gaseous mixture of hydrocarbon constituents, hydrogen sulphide and mercaptans, and carbonyl oxy sulphide. The feed is introduced into the bottom of treating zone 1 by means of feed line 2. These gases flow upwardly through treating zone 1 and countercurrently contact a downflowing solvent which is introduced into the top of treating zone 1 by means of feed line 3. For purposes of description, it is assumed that this solvent comprises a mixture of di-ethanolamine and tri-ethanolamine. Temperature and pressure conditions in treating zone 1 are adapted to secure substantially complete removal of the hydrogen sulphide. The solution comprising di-ethanolamine and tri-ethanolamine containing dissolved therein the hydrogen sulphide is removed from treating zone 1 by means of line 4, passed through heat exchanging means 5 and introduced into solvent regeneration zone 6. Temperature and pressure conditions are adjusted in regeneration zone 6 to free the solvent of the hydrogen sulphide which is removed overhead by means of line 7 and disposed of in any manner desirable. The hydrogen sulphide free solvent is withdrawn from the bottom of regeneration zone 6 by means of line 8, passed through heat exchanging means 5, cooled in water cooler 9 and recycled to treating zone 1.

The gases free of hydrogen sulphide and comprising mercaptans and carbonyl sulphide are removed overhead from zone 1 by means of line 10 and introduced into the bottom of a secondary solvent contacting zone 11 wherein the gases are treated to free the same of the mercaptan compounds. This is preferably secured by utilizing an alkali metal hydroxide solution, such as a sodium hydroxide solution, and countercurrently contacting the upflowing gases with the downflowing solution. The treating solvent is withdrawn from secondary treating zone 11 by means of line 12, passed through heat exchanging means 13 and introduced into secondary solvent regeneration zone 14. In this zone temperature and pressure conditions are adapted to regenerate the sodium hydroxide solution under conditions to remove overhead by means of line 15 the mercaptan compounds. The regenerated sodium hydroxide solution is withdrawn from the bottom of zone 14 by means of line 16 and recycled to the secondary treating zone 11. Gases substantially completely free of sulphur compounds other than carbonyl sulphide are removed from secondary treating zone 11 by means of line 17 and introduced into tertiary treating zone 18. In this zone the gases are contacted with monoethanolamine under conditions to free the gases completely of the carbonyl sulphide. For purposes of illustration it is assumed that the solvent utilized in this zone consists of 40% monoethanolamine and 60% water. The treated gases free of sulphur compounds are removed from the top of tertiary treating zone 18 by means of line 19 and handled in any manner desirable. The monoethanolamine solution containing dissolved therein the carbonyl sulphide is removed from the bottom of tertiary treating zone 18 by means of line 20, passed through heating zone 21 and introduced into a reaction zone 22 wherein the heated mixture is held for a sufficient time to secure substantially complete conversion of the carbonyl sulphide to diethanol urea. Hydrogen sulphide is removed from zone 22 by means of line 23 while the solution containing the dissolved diethanol urea is introduced into agitation zone 24. In this zone the mixture is mixed with a sufficient quantity of a substance which is adapted to precipitate the diethanol urea. For purposes of description it is assumed that the substances comprise isopropyl alcohol. The isopropyl alcohol is withdrawn from storage zone 25 and introduced into zone 24 by means of line 26. The solution comprising isopropyl alcohol and the precipitated diethanol urea is withdrawn from zone 24 by means of line 27 and introduced into separating means 28 which for the purpose of description is taken to be a filtering zone. In filtering zone 28 the diethanol urea is separated from the isopropyl alcohol and the unreacted monoethanolamine and removed from the same by means of line 29. The diethanol urea may be further refined or handled as desired. The isopropyl alcohol and the unreacted monoethanolamine are passed into distillation zone 30 by means of line 31. Temperature and pressure conditions are adjusted to remove overhead by means of line 31 the isopropyl alcohol which is recycled to zone 24. The monoethanolamine is removed from distillation zone 30 by means of line 32 and recycled to zone 18 along with made up monoethanolamine which is introduced by means of line 33.

Referring specifically to Figure 2, it is assumed for the purpose of illustration that gases similar to the gases described with respect to Figure 1 are introduced into the bottom of treating zone 50 by means of feed line 51. These gases flow upwardly through treating zone 50 and contact a down flowing solvent which is introduced by means of line 52. For the purpose of description, it is assumed that the solvent comprises an aqueous solution of monoethanolamine and diethanolamine or tri-ethanolamine. Treating zone 50 is provided with suitable distributing and contacting means. Temperature and pressure conditions are adjusted in treating zone 50 to secure substantially complete removal of the hydrogen sulphide and carbonyl sulphide from the feed gases. The treated gases comprising mercaptans are withdrawn overhead by means of line 53 and passed into treating zone 54 wherein the same are treated for the removal of the mercaptan compounds. This is preferably secured by countercurrently contacting the same with a sodium hydroxide solution which is introduced into zone 54 by means of line 55. Treated gases substantially completely free of sulphur compounds are removed overhead from zone 54 by means of line 56 and handled in any manner desirable. The sodium hydroxide solution is withdrawn from zone 54 by means of line 57 and passed into regeneration zone 58 wherein it is treated to regenerate the same. The mercaptan compounds are removed overhead from regeneration zone 58 by means of line 59 while the regenerated caustic solution is recycled to zone 54 by means of line 55.

The ethanolamine solution containing dissolved therein the carbonyl sulphide and the hydrogen sulphide is introduced into secondary treating zone 60 by means of line 61. In secondary treating zone 60 the ethanolamine solution is treated by heating in a manner to free the same of hydrogen sulphide which is removed overhead from zone 60 by means of line 62 and further refined or disposed of as desired. Any mercaptans taken up by the ethanolamine solution in zone 50 likewise will be removed overhead by means of line 62. The ethanolamine solution substantially completely free of hydrogen sulphide and mercaptans is withdrawn from zone 60 by means of line 63 and passed into heating zone 64 in which water is removed by means of line 65. The solvent solution containing precipitated diethanol urea is removed from zone 64 by means of line 66 and passed through separating zone 67 wherein the diethanol urea is separated from the solution. The diethanol urea is removed by means of line 68 while the solution is removed by means of line 69 and recycled to zone 50. Fresh monoethanolamine may be introduced into the system by means of line 72. When recycling the solution removed from zone 67 by means of line 69 it is necessary to add more monoethanolamine by means of line 70 in order to adjust the composition of the solvent and to make up for the monoethanolamine which has reacted with the carbonyl sulphide. It is also necessary to add water by means of line 71 in order to adjust the solution for the water removed by means of line 65.

A preferred modification of the present invention comprises withdrawing the solution from the bottom of zone 60 and adding thereto an alcohol, preferably isopropyl alcohol, which is withdrawn from zone 72 and introduced into the solution by means of line 73. Under these conditions the diethanol urea precipitates and is removed from the solution by separating means 74 which preferably comprises a filter. The diethanol urea is removed by means of line 75 and further handled as desired while the solution comprising monoethanolamine and tri-ethanolamine as well as the added isopropyl alcohol is withdrawn from separating zone 74 by means of line 76 and introduced into distillation zone 77 wherein the isopropyl alcohol is separated from the ethanolamine solution and returned to storage 72 by means of line 78. The ethanolamine solution is removed from the bottom of distillation zone 77 by means of line 78 and recycled to zone 50 and handled as described.

The process of the present invention may be widely varied. It is to be understood that if the feed gases are free of sulphur compounds other than carbonyl sulphide it will not be necessary to first remove other objectionable sulphur compounds in a manner as described with respect to Figure 1 or with respect to Figure 2. It is also to be understood that the process of the present invention may be applied to the removal of carbonyl sulphide from liquid solutions containing the same.

Although the monoethanolamine may be employed as a pure solution for reacting the same with the carbonyl sulphide it is preferred that the monoethanolamine be employed in an aqueous solution. Particularly desirable results are secured when the solution employed for the removal of the carbonyl sulphide consists of 15% to 60% of monoethanolamine, preferably from 40% to 50% monoethanolamine and the remainder water.

Temperature and pressure conditions may be widely varied depending upon the feed being treated, the concentration and particular character of the sulphur compounds present, and upon various other operating conditions. In general, it is preferred to employ pressure in the range from about atmospheric to 5 or 6 atmospheres, although under certain conditions sub-atmospheric conditions may be employed. Temperature conditions are in the general range from about 60° to 120° F. Preferred temperatures for the extraction of carbonyl sulphide utilizing monoethanolamine are in the general range from about 80° to 100° F. Furthermore, in order to secure the conversion of the carbonyl sulphide and monoethanolamine to diethanol urea it is preferred that the solution be heated to a temperature above 80° F., preferably to a temperature in the range from about 200° to 220° F.

The quantity of solvent used likewise may vary considerably and will depend upon other operating conditions as described above. For example, it may be desirable to treat from 10 to 1000 cubic feet of gas per one gallon of monoethanolamine solution depending upon the concentration of the carbonyl sulphide present. For example, we have found that when carbonyl sulphide is present in the concentration of 20 grains of carbonyl sulphide (calculated as sulphur) per 100 cubic feet of gas, it is preferred to utilize one gallon of a 15% monoethanolamine solution in water per 50 cubic feet of gas.

The feed gases should preferably be free of sulphur dioxide. Also either method as described with respect to Figure 2 may be employed in order to precipitate the diethanol urea. Water may be evaporated from the solution or an oxygenated organic solvent such as an alcohol added. A preferred reagent comprises isopropyl alcohol. If the feed gas contains only a small concentration of carbonyl sulphide it is desirable to circulate the monoethanolamine until it is substantially saturated before removing the solution. By operating in this manner a treated saturated solution in a batch operation is handled to recover the diethanol urea. Thus, the operation may be continuous with respect to the removal of the carbonyl sulphide from the feed gases but comprises a batch operation with respect to the recovery of the diethanol urea from the monoethanolamine which is recycled to the system.

In order to illustrate the invention further, the following examples are given which should not be construed as limiting the same in any manner whatsoever:

*Example 1*

A gas mixture containing 21.76 grains of carbonyl sulphide (calculated as sulphur per 100 cubic feet of gas) was contacted with a monoethanolamine solution. The monoethanolamine solution consisted of 10% monoethanolamine and 90% water. The amount used was 2 gallons of solvent per 100 cubic feet of gas. The treated gas contained only 2.5 grains of sulphur present as carbonyl sulphide per 100 cubic feet of gas.

In a similar operation, when the solution employed was the same as that described with respect to the above operation except that diethanolamine was used, no appreciable removal of the carbonyl sulphide was secured.

*Example 2*

In several other operations, various solutions of a gas mixture similar to that described with respect to Example 1 were treated with other solvents with the following results:

| Solvent used | Grains sulphur (per 100 cubic feet of gas) in residual gas present as carbonyl sulphide |
|---|---|
| None | 21.76 |
| 10% sulphuric acid | 14.74 |
| 14% ammonia | 10.9 |
| 10% monoethanolamine | 2.8 |

From the above, it is apparent that the present invention is particularly desirable and effective over other solvents.

What we claim as new and wish to protect by Letters Patent is:

1. Process for the removal of carbonyl sulphide from hydrocarbon feed mixtures containing the same, which comprises reacting the carbonyl sulphide with monoethanolamine.

2. Process for the removal of carbonyl sulphide from feed gases containing the same, which comprises contacting the same with an aqueous solution consisting of monoethanolamine.

3. Process as defined by claim 2 in which said aqueous solution comprises from about 15% to 60% of monoethanolamine.

4. Process for the production of diethanol urea which comprises reacting carbonyl sulphide with monoethanolamine, heating the mixture, precipitating the diethanol urea, and separating the same.

5. Process as defined by claim 4, in which said diethanol urea is precipitated by the removal of water from the solution.

6. Process as defined by claim 4, in which the diethanol urea is precipitated by the addition of an alcohol.

7. Process for the continuous removal of hydrogen sulphide, mercaptans, and carbonyl sulphide from feed gases containing the same, which comprises treating the gases with an ethanolamine selected from the class consisting of di-ethanolamine and tri-ethanolamine, whereby the hydrogen sulphide is removed, separating the treated gases containing carbonyl sulphide and mercaptan compounds and treating the same in a secondary zone with an alkali metal hydroxide solution whereby the mercaptan compounds are removed, treating the separated gases in a tertiary zone with an aqueous solution consisting of monoethanolamine whereby the carbonyl sulphide is removed from the gases.

8. Process as defined by claim 7, in which said aqueous solution comprises from about 15% to 60% monoethanolamine.

9. Process for the removal of mercaptans, hydrogen sulphide, and carbonyl sulphide from gases containing the same and for the production of diethanol urea, which comprises treating the gases with an ethanolamine selected from the class consisting of di-ethanolamine and tri-ethanolamine, whereby the hydrogen sulphide is removed, separating the treated gases containing carbonyl sulphide and mercaptan compounds and treating the same in a secondary zone with an alkali metal hydroxide solution whereby the mercaptan compounds are removed, treating the separated gases in a tertiary zone with an aqueous solution consisting of monoethanolamine whereby the carbonyl sulphide is removed from the gases, heating the monoethanolamine solution removed from said tertiary zone and removing hydrogen sulphide therefrom, then precipitating diethanol urea and separating the same.

10. Process as defined by claim 9, in which the diethanol urea is precipitated by the removal of water from the aqueous solution.

11. Process as defined by claim 9, in which the diethanol urea is precipitated by the addition of isopropyl alcohol to the solution removed from said tertiary zone.

WILLIAM J. KERNS.
CLAYTON M. BEAMER.